(12) United States Patent
Helmersson

(10) Patent No.: US 7,010,078 B2
(45) Date of Patent: Mar. 7, 2006

(54) FUEL ROD FOR A NUCLEAR PLANT AND A PLENUM SPRING ARRANGED TO BE PROVIDED IN SUCH A FUEL ROD

(75) Inventor: Sture Helmersson, Kolbäck (SE)

(73) Assignee: Westinghouse Atom AB, Västerås (SE)

( * ) Notice: Subject to any disclaimer, the term of this patent is extended or adjusted under 35 U.S.C. 154(b) by 0 days.

(21) Appl. No.: 10/479,955

(22) PCT Filed: Jun. 7, 2002

(86) PCT No.: PCT/SE02/01108

§ 371 (c)(1),
(2), (4) Date: Dec. 8, 2003

(87) PCT Pub. No.: WO02/101753

PCT Pub. Date: Dec. 19, 2002

(65) Prior Publication Data

US 2004/0196952 A1    Oct. 7, 2004

(30) Foreign Application Priority Data

Jun. 8, 2001 (SE) ................................. 0102034

(51) Int. Cl.
*G21C 3/00* (2006.01)

(52) U.S. Cl. .................... 376/412; 376/413; 376/420

(58) Field of Classification Search ............. 376/412, 376/413, 418, 420

See application file for complete search history.

(56) References Cited

U.S. PATENT DOCUMENTS

| 3,899,392 A | * | 8/1975 | Grossman et al. ........... 376/418 |
| 3,989,590 A | * | 11/1976 | Wehrli et al. ............... 376/413 |
| 4,011,134 A | * | 3/1977 | Stehle et al. ............... 376/418 |
| 4,871,509 A | * | 10/1989 | Johansson ................... 376/412 |
| 5,317,612 A | * | 5/1994 | Bryan et al. ................ 376/451 |
| 5,329,566 A | * | 7/1994 | King .......................... 376/418 |

FOREIGN PATENT DOCUMENTS

| EP | 0340563 | 11/1989 |
| EP | 0361037 | 4/1990 |
| JP | 10020061 | 1/1998 |

* cited by examiner

Primary Examiner—Jack Keith
Assistant Examiner—R Palabrica
(74) Attorney, Agent, or Firm—Swidler Berlin LLP

(57) ABSTRACT

The present invention relates to a fuel rod for a nuclear plant and a plenum spring arranged to be provided in a fuel rod. The fuel rod (1) comprises a cladding tube (2) sealed at its ends by end plugs (3, 4), a plurality of fuel pellets (5) stacked on each other inside the cladding tube (2) such that they form a column of pellets and said plenum spring (6) arranged to hold with a spring force the column of pellets against the lower second end of the cladding tube (2) during operation. The plenum spring (6) comprises a first length variable part (8) which abuts the uppermost located fuel pellet (5) in the column of pellets with an end portion (9), a second part (10) which allows engagement of the plenum spring (6) against an inner surface of the cladding tube (2) by a radially outwardly directed pressure and a third part (11) which allows releasing of the second part (10) of the plenum spring (6) in the cladding tube (2) during operation of the nuclear plant.

10 Claims, 1 Drawing Sheet

FUEL ROD FOR A NUCLEAR PLANT AND A PLENUM SPRING ARRANGED TO BE PROVIDED IN SUCH A FUEL ROD

BACKGROUND OF THE INVENTION AND KNOWN ART

The present invention relates to a fuel rod for a nuclear plant and a plenum spring arranged to be provided in a fuel rod. The fuel rod comprises a cladding tube sealed by a first end plug at a first end and a second end plug at a second end, a plurality of fuel pellets stacked on each other inside the cladding tube such that they form a column of pellets and a plenum spring provided in a space of the fuel rod in order to, at least during transportation, hold the column of pellets with a spring force towards the second end of the cladding tube and wherein the plenum spring comprises a first length variable part arranged to abut the uppermost located fuel pellet in the column of pellets with an end portion and a second part arranged to allow engagement of the plenum spring against an inner surface of the cladding tube by a radially outwardly directed pressure.

Plenum springs are arranged in fuel rods for the purpose of holding the fuel pellets, which are arranged inside the cladding tube, at place during the transportation, which occurs before the fuel rods are provided in a reactor vessel. During the transportation, the fuel rods take at least partly a horizontal position and the task of the plenum spring is to prevent that the column of pellets completely or partially is displaced inside the cladding tube. If such a displacement of the column of pellets will occur, the risk exists that one or several fuel pellets is inclined inside the cladding tube and when the fuel rods is provided in a vertical position inside a reactor vessel such inclined fuel pellets prevent that the column of pellets is displaced to a correct position for operation. Consequently, the function of the plenum spring is to prevent that such a displacement or a split of the column of pellets arises during the transportation.

During the operation of a nuclear plant, fission gases are accumulated in the space above the fuel pellets in the cladding tube. Therefore, the plenum spring, which is arranged in this space, ought to take up a volume as small as possible in order not to restrict the space of the fission gases. An other advantage of using a small plenum spring is that it may be arranged at a distance from the upper end of the cladding tube where an end plug normally is welded for sealing the cladding tube. For that reason, special measures for preventing that the spring material melts and is mixed with the material of the cladding tube in the weld joint formed do not need to be taken. This also increases the space for fission gases in addition to reducing the costs.

Plenum springs have been developed which allow engagement of the plenum spring against the inside of the cladding tube at a suitable distance above the column of pellets such that a length variable springy part of the spring is allowed to act against the uppermost fuel pellet in the column of pellets for holding the column of pellets in place in the fuel rod during the transportation. JP 10020061 shows an example of such a plenum spring. During the operation of a nuclear plant, the fuel pellets are heated and the column of pellets is extended. The length variable part of the plenum spring is thereby compressed and the pressure of the plenum spring against the inside of the cladding tube increases until the friction in the contact surface between the plenum spring and the inside of the cladding tube is overcome such that the plenum spring is released. If the plenum spring does not lose its grip against the inside of the cladding tube before the pressure becomes too heavy, the cladding tube risks to be deformed.

SUMMARY OF THE INVENTION

The object of the present invention is to provide a fuel rod for a nuclear plant having a plenum spring, which has a relatively simple construction with a small volume at the same time as it has a function which secures that it let loose its grip against the inside of the cladding tube before a pressure in the contact surface arises which risks to deform the cladding tube.

The above mentioned object is achieved by the plenum spring of the initially defined kind, which is characterized in that the plenum spring comprises a third part which allows releasing of the engagement of the second part of the plenum spring in the cladding tube during operation of the nuclear plant. Since the plenum spring does not have any function to fulfil during the operation, it is important to prevent that the pressure of the plenum spring against the cladding tube at least does not increase above a pressure level at which the risk for deformation of the cladding tube exists. Such a third part of the plenum spring, which allows releasing of the engagement of the second part of the plenum spring in the cladding tube, will suitably be activated by a parameter related to the operation. Such a parameter related to the operation may be the length of the column of pellets, which hence is extended during the operation on account of the increased temperature. Since a column of pellets usually comprises relatively many fuel pellets (in the order of 300–400 fuel pellets with a height of about 1 cm), the length variation of the column of pellets may be relatively large during operation.

According to a preferred embodiment of the present invention, said third part allows such a releasing when the first length variable part of the plenum spring is compressed to be below a specific length. Consequently, since the first part of the plenum spring has an end portion, which abuts the upper fuel pellet in the column of pellets, the first part is compressed when the column of pellets during the operation is heated and extended. The compression of the first part of the plenum spring during the operation supplies an increased pressure in the contact surface between the second part of the plenum spring and the cladding tube. Since a releasing is initiated when the first part is below a specific length, the pressure, which the plenum spring will exert against the contact surface in the cladding tube also, is restricted. By a suitable choice of such a specific length it is ensured, that the pressure of the engagement surface does not exceed the pressure level when the cladding tube risks to be deformed. A releasing of the engagement of the second part of the plenum spring results in a displacement upwardly of the plenum spring in the cladding tube. Preferably, said third part comprises a stop portion arranged to obtain contact with the outermost located pellet in the column of pellets when the first part is compressed to said specific length. If the column of pellets is extended such that the first part is compressed to be below said specific length, the column of pellets displaces the stop portion upwardly. Thus, the third part obtains a displacement motion, which may be used for releasing the engagement of the second part of the plenum spring. The pressure of the second part against the inside of the cladding tube decreases thereby so much that the friction at the contact surface may be overcome and the plenum spring be released and displaced upwardly in the cladding tube.

According to another preferred embodiment of the present invention, the second part comprises a wire element having a helical extension with an outer diameter of such a size that said radially outwardly directed pressure against the inner surface of the cladding tube is provided. Consequently, the second part has in an unloaded state an outer diameter, which exceeds the inner diameter of the cladding tube. Hence, for mounting the plenum spring in the cladding tube, the diameter of the second part has to be compressed by a suitable tool. Alternatively, the cladding tube has to perform this compression and the plenum spring be mounted against the friction resistance. The friction resistance may be decreased evidently by rotating the spring in the rising direction of the spring such the spring during the montage "is screwed" inwardly. The second part is allowed to expand such that the plenum spring is fixed with an outwardly directed pressure against the inner surface of the cladding tube at a suitable level in the cladding tube. Advantageously, said third part comprises a wire element, which constitutes an extension of the helical wire element of the second part. Such an extension of the wire element of the second part constitutes a construction, which in a simple manner allows a transmission of a motion from the stop portion of the third part to the helical wire element of the second part. Advantageously, a displacement motion from the third part may extend the helical second part in an axial direction which results in that the outer diameter of the second part is reduced and that the plenum spring is allowed to be released from its engagement in the cladding tube. Preferably, the third part comprises a principally axial extension inside the cladding tube in a direction towards the ending stop portion. Thus, the third part obtains a simple but functional construction for transferring a displacement motion which releases the second part. Advantageously, the axial extension of the third part occurs substantially centrally in the cladding tube. Thus, the plenum spring obtains a symmetric construction and the third part may extend through the cavity, which is defined by the helical construction of the second part.

According to another preferred embodiment of the present invention, the first part comprises a wire element having a helical extension with an outer diameter, which is less than the inner diameter of the cladding tubes. Such a first part in the form of a helical spring supplies in an effective manner a spring pressure against the column of pellets such that a displacement of the fuel pellets is prevented during the transportation. Advantageously, the plenum spring is formed of a wire element in one piece. Thus, a plenum spring is obtained which both has a small volume and is simple to manufacture. Such a plenum spring may be manufactured of stainless steel. Stainless steel is a material, which has such material properties that it in a relatively uncomplicated manner may be formed to a plenum spring in one piece. Stainless steel also is relatively inexpensive, has good corrosion resistance and good strength and resilience properties. Since the plenum spring takes up a relatively small volume, the neutron absorption also becomes relatively small. Alternatively, the plenum spring may be manufactured of a more expensive material such as a zirconium-based alloy, which has a lower neutron absorption than stainless steel, but also inferior resilience properties.

BRIEF DESCRIPTION OF THE DRAWINGS

In the following, an example of a preferred embodiment of the invention is described with reference to the attached drawings, in which.

DETAILED DESCRIPTION OF AN EMBODIMENT OF THE INVENTION

Figure 1:
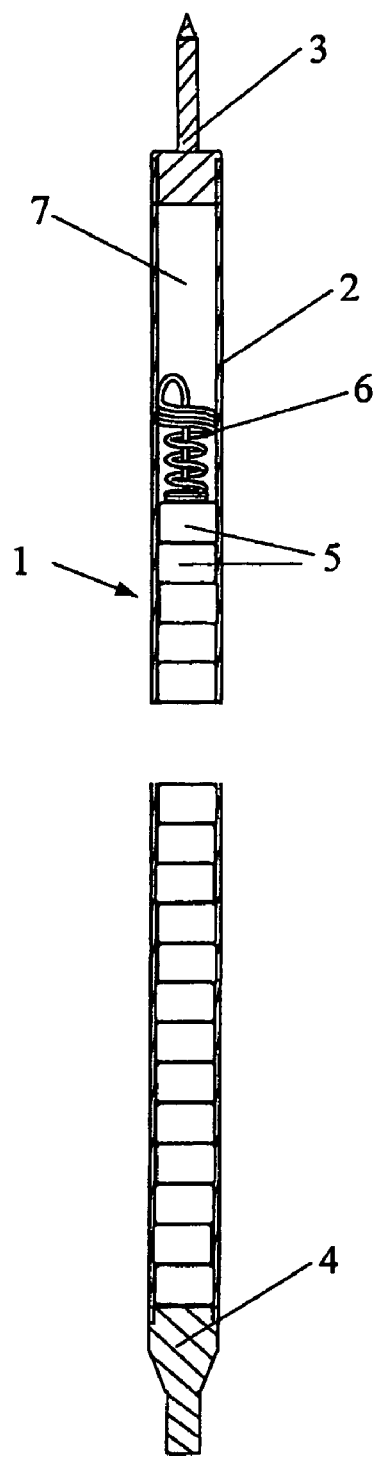
FIG. 1 shows a fuel rod according to the present invention.

FIG. 1 shows an upper part and a lower part of a fuel rod 1. The fuel rod 1 comprises a cladding tube 2 which is sealed by a first end plug 3 at a first upper end and a second end plug 4 at a second lower end. With upper and lower means the position of the parts when the fuel rod 1 is mounted in a reactor vessel. A plurality of fuel pellets 5 are stacked on each other inside the cladding tube 2 such that they form a column of pellets. A plenum spring 6 is arranged in a space 7 in the cladding tube 2 which downwardly is restricted by the uppermost located fuel pellet 5 in the column of pellets and upwardly by the first end plug 3 of the cladding tube. The space 7 has the task to receive the fission gases, which are created during the radiation of the fuel during operation of a nuclear plant. The plenum spring 6 is arranged to exert a spring pressure against the uppermost located fuel pellet 5 and thus to hold the column of pellets against the second end of the cladding tube 2. When the fuel rod is mounted in a reactor vessel, it has a vertical extension and the column of pellets is held by means of the gravitation in a correct position against the second lower end plug 4. Before the fuel rod 1 is mounted in a reactor vessel, it is subjected to transports where it is, at least partly, located in a horizontal position. The task of the plenum spring 6 is to prevent that the column of pellets is displaced or is split in the fuel rod 1 during this transportation.

Figure 2:
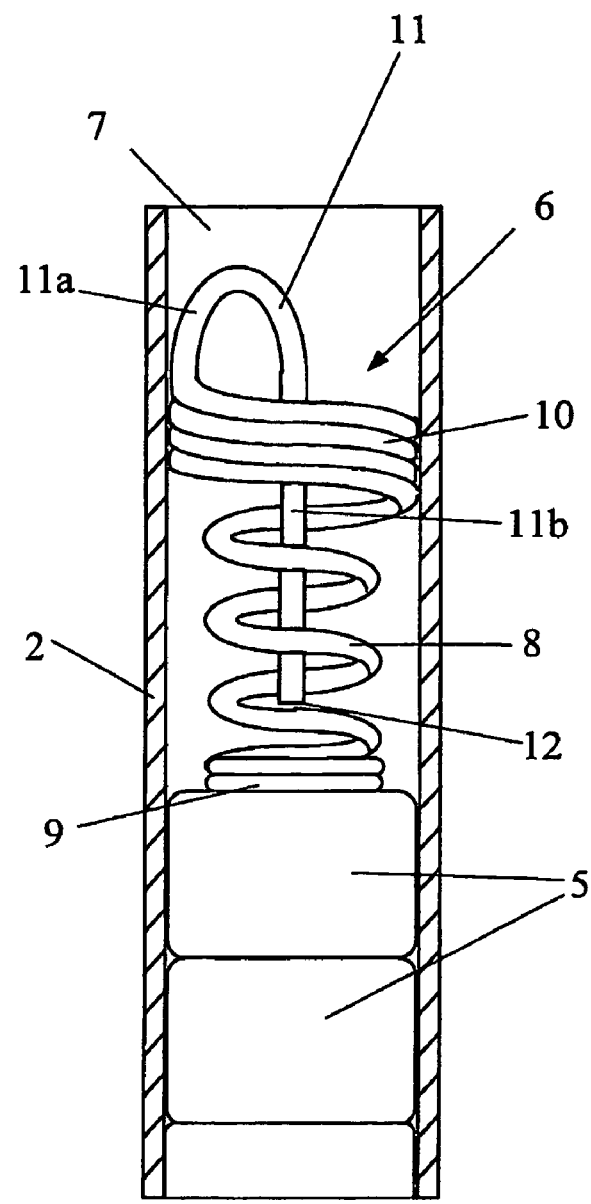
FIG. 2 shows a plenum spring according to the present invention.

FIG. 2 shows the plenum spring in FIG. 1 more in detail. The plenum spring 6 comprises a first part 8 comprising a wire element having a helical extension with an outer diameter, which is less than the inner diameter of the cladding tube 2. Thus, the first part 8 may be varied in length in an unhindered manner in the cladding tube 2. The first part 8 comprises an end portion 9, which is arranged to abut the uppermost located fuel pellet 5 in the column of pellets. The plenum spring comprises a second part 10 comprising a wire element, which constitutes a continuation of the wire element of the first part 8. The wire element of the second part 10 also has a helical extension but has a larger diameter than the first part 8. The outer diameter of the second part 10 is compressed in a mounted state such that the second part 10 exerts a radially outwardly directed pressure against the inner surface of the cladding tube 2. By means of the pressure of the second part 10 against the inner surface of the cladding tube 2 the plenum spring 6 is allowed to be fixed in a desired position in the space 7. Finally, the plenum spring 6 comprises a third part 11 comprising a wire element, which constitutes a continuation of the wire element of the second part 10. The third part 11 comprises a curved portion 11a having a substantially 180° bending as well as a straight portion 11b. The curved portion 11a connects the second part 10 of the plenum spring with the straight portion 11b and is suitably shaped for gripping the plenum spring 6 during the mounting. The straight portion 11b has a substantially axial extension centrally inside the cladding tube 2 in a direction towards an ending stop portion 12. The straight portion 11b extends here both through the helical first 8 and second 10 part of plenum spring 6. Consequently, the plenum spring 6 is formed by a wire element in one piece. A plenum spring 6 of the above mentioned kind may be formed by a thick wire or a thin rod which is bent such that it extends along the helical paths of the first part 8 and second part 10 before the plenum spring is provided with the ending third part 11. Preferably, the wire or rod has a substantially circular cross section and is with advantage manufactured of stainless steel. Stainless steel is relatively inexpensive, has good corrosion resistance and good strength properties. Since the plenum spring takes up such a small volume, the neutron absorption here becomes relatively small. Alternatively, more expensive material such as zirconium based alloys may be used which has a low neutron absorption, good corrosion resistance and good strength properties.

The plenum spring 6 may be mounted in the fuel rod by means of a special tool which has the ability to reduce the diameter of the second part 10 of the plenum spring 6 such the plenum spring 6 is allowed to be moved down into the cladding tube 2. When the plenum spring 6 has been moved down to a desired position in the cladding tube 2, the second part 10 is allowed to expand radially such that it, with a spring pressure, abuts the inner surface of the cladding tube 2. Alternatively, the cladding tube has to perform this compression and the plenum spring 6 is mounted against the friction resistance. The friction resistance will be decreased evidently by rotating the plenum spring 6 such that it is screwed into the cladding tube 2. The radially outwardly acting spring pressure of the second part 10 results in that the plenum spring 6 is fixed in the cladding tube 2. In the fixing position of the plenum spring 6, the end portion 9 of the first part 8 is arranged with a spring pressure against the uppermost located fuel pellet 5 in the column of pellets. The stop portion 12 of the third part 11 here is located at a distance from the uppermost located fuel pellet 5 in the column of pellets. After the plenum spring 6 is mounted in the cladding tube 2, the upper end plug 3 is welded to the upper end of the cladding tube 2. Since the plenum spring 6 is fixed inside the cladding tube 2 at a suitable distance from the upper end plug 3, the spring material does not risk to melt and be mixed with the clad material in the weld joint.

During the transportation of the finally mounted fuel rod 1, the second part of the plenum spring 6 is fixed against the inner surface of the cladding tube 2 and the length variable first part 8 abuts the column of pellets with a spring pressure. If the fuel rod 1 is provided in a horizontal position or is subjected to transportation motions which initiate a displacement motion of the column of pellets, such a motion is substantially immediately reduced by the first length variable springy part 8. Thereafter, the first part 8 removes the column of pellets back to an originally correct position.

After the transport, the fuel rod 1 is arranged in a reactor vessel in a nuclear plant. The fuel rods 1 are placed in a vertical position in the reactor vessel 5 and the fuel pellets 5 are here held in an intended place in the fuel rod 1 by its own weight. The plenum spring 6 now has not longer any function to fulfil. During the operation of the nuclear plant, the fuel pellets 5 are heated. The fuel pellets 5 are expanded and the column of pellets, which contains a plurality of fuel pellets 5, thus obtains a non-negligible extension. When the column of pellets is extended, the first part 8 of the plenum spring is compressed. When the compression pressure from the first part 8 of the plenum spring increases, the pressure of the second part increases against the inner surface of the cladding tube 2. When the compression pressure reaches a sufficiently high value, the friction between the second part 10 and the inner surface of the cladding tube ought to be overcome such that the second part 10 is released and the plenum spring 6 will be displaced upwardly. The task of the third part 11 of the plenum spring is to allow such a releasing so that the cladding tube 2 certainly does not risk to be deformed. When the length variable first part 8 is compressed to a specific length, the stop portion 12 of the third part 11 obtains contact with the upper fuel pellet 5. If the column of pellets obtains a further extension such the first part is compressed to be below said specific length, the column of pellets displaces the straight portion 11b of the third part 11 upwardly by means of the stop portion 12. Thus, the curved portion 11a of the third part transforms an upwardly directed motion to the second part 10. Thereby, the second part 10 is displaced upwardly and obtains an extension in an axial direction. Such an extension results in that the outer diameter of the second part is reduced and the pressure against the inner surface of the cladding tubes 2 decreases such that the plenum spring may be released and displaced upwardly. Consequently, the stop portion 12 of the third part obtains contact with the uppermost fuel pellet 5 when the first part is compressed to a specific length. By a suitable choice of this specific length, it is ensured that the pressure of the second part 10 against the inner surface of the cladding tube does not exceed a pressure level at which the cladding tube risks to be deformed.

The present invention is not in any way restricted to the embodiment described in the drawings but may be modified freely within the scope of the claims.

What is claimed is:

1. A nuclear fuel rod for a nuclear plant, wherein the fuel rod comprises a cladding tube sealed by a first end plug at a first end and second end plug at a second end, a plurality of fuel pellets stacked on each other inside the cladding tube such that they form a column of pellets and a plenum spring arranged in a space in the fuel rod in order to, at least during transportation, hold the column of pellets with a spring force towards the second end of the cladding tube and wherein the plenum spring comprises a first length variable part arranged to abut towards the uppermost located fuel pellet in the column of pellets with an end portion and a second part arranged to allow engagement of the plenum spring against an inner surface of the cladding tube by a radially outwardly directed pressure, wherein the plenum spring comprises a third part arranged to allow releasing of the engagement of the second part of the plenum spring in the cladding tube during operation of the nuclear plant, wherein said third part allows such a releasing when the first length variable part of the plenum spring is compressed to be below a specific length, and wherein said third part comprises a stop portion arranged to obtain contact with the uppermost located fuel pellet in the column of pellets when the first part is compressed to said specific length.

2. The fuel rod according to claim 1, wherein the second part comprises a wire element having a helical extension with an outer diameter of such a size that said radially outwardly directed pressure towards the inner surface of the cladding tube is provided.

3. The fuel rod according to claim 2, wherein said third part comprises a wire element which comprises an extension of helical wire element of the second part.

4. The fuel rod according to claim 1, wherein said third part comprises a principally axial extension in the cladding tube in a direction towards the end portion.

5. The fuel rod according to claim 4, wherein the axial extension of said third part occurs substantially centrally in the cladding tube.

6. The fuel rod according to claim 1, wherein the first part comprises a wire element having a helical extension with an outer diameter which is less than the inner diameter of the cladding tube.

7. The fuel rod according to claim 1, wherein the plenum is formed by a wire element in one piece.

8. The fuel rod according to claim 1, wherein the plenum is manufactured of stainless steel.

9. The fuel rod according to claim 1, wherein said third part is coupled to said second part such that linear movement of said third part toward said first end plug reduces said radially outwardly directed pressure.

10. A nuclear fuel rod for a nuclear plant, wherein the fuel rod comprises a cladding tube sealed by the first end plug at a first end and a second end plug at a second end, plurality of fuel pellets stacked on each other inside the cladding tube such that they form a column of pellets and a plenum spring positioned within the tube between the first end plug and an uppermost fuel pellet in the column of pellets such that it applies a spring force to said fuel pellets toward the second end plug;

the plenum spring including a first length-variable part abutting the uppermost fuel pellet, a second part initially in contact with and applying radially outward pressure to an inner surface of the cladding tube, and a third part including a stop portion positioned to contact the uppermost fuel pellet upon compression of the first spring part to a predetermined length;

wherein said third part reduces the radially outward pressure upon compression of the first spring part below the predetermined length.

* * * * *

UNITED STATES PATENT AND TRADEMARK OFFICE
CERTIFICATE OF CORRECTION

| | |
|---|---|
| PATENT NO. | : 7,010,078 B2 |
| APPLICATION NO. | : 10/479955 |
| DATED | : March 7, 2006 |
| INVENTOR(S) | : Sture Helmerson |

It is certified that error appears in the above-identified patent and that said Letters Patent is hereby corrected as shown below:

Title Page

Item (73), Assignee, "Westinghouse Atom B" should read -- Westinghouse Electric Sweden AB --

Signed and Sealed this

Eighteenth Day of July, 2006

JON W. DUDAS
*Director of the United States Patent and Trademark Office*